United States Patent

Secunda

[15] 3,696,490

[45] Oct. 10, 1972

[54] CLAMP FOR BEARING ASSEMBLY

[72] Inventor: Kenneth Secunda, Detroit, Mich.

[73] Assignee: Federal-Mogul Corporation, Southfield, Mich.

[22] Filed: Feb. 4, 1971

[21] Appl. No.: 112,745

[52] U.S. Cl. ............... 29/201, 29/148.4 C, 29/477, 269/156, 269/254 R
[51] Int. Cl. .................. B23p 19/04, B21d 53/12
[58] Field of Search ......... 29/148, 4 A, 148.4 C, 464, 29/477, 493, 201 R; 269/156, 287, 254 R

[56] References Cited

UNITED STATES PATENTS 3,605,247 9/1971 Bingle et al. .............. 29/477
2,846,379 8/1958 Chambers et al. ...... 269/156 X
3,256,585 6/1966 Ripple .................. 29/148.4 C Primary Examiner—Theron E. Condon
Assistant Examiner—Neil Abrams
Attorney—Harness, Dickey & Pierce

[57] ABSTRACT

A three legged wire clamp for a bearing assembly comprised of a double shouldered race member, a plurality of roller bearings positioned in the race member, an unwelded metal retainer strip which is circular in shape in the form of a split ring and hence contains a gap which is subsequently welded to secure the retainer strip in position, and a wire clamp means which inwardly biases the retainer to hold the retainer and bearings in a properly oriented position prior to welding.

2 Claims, 3 Drawing Figures

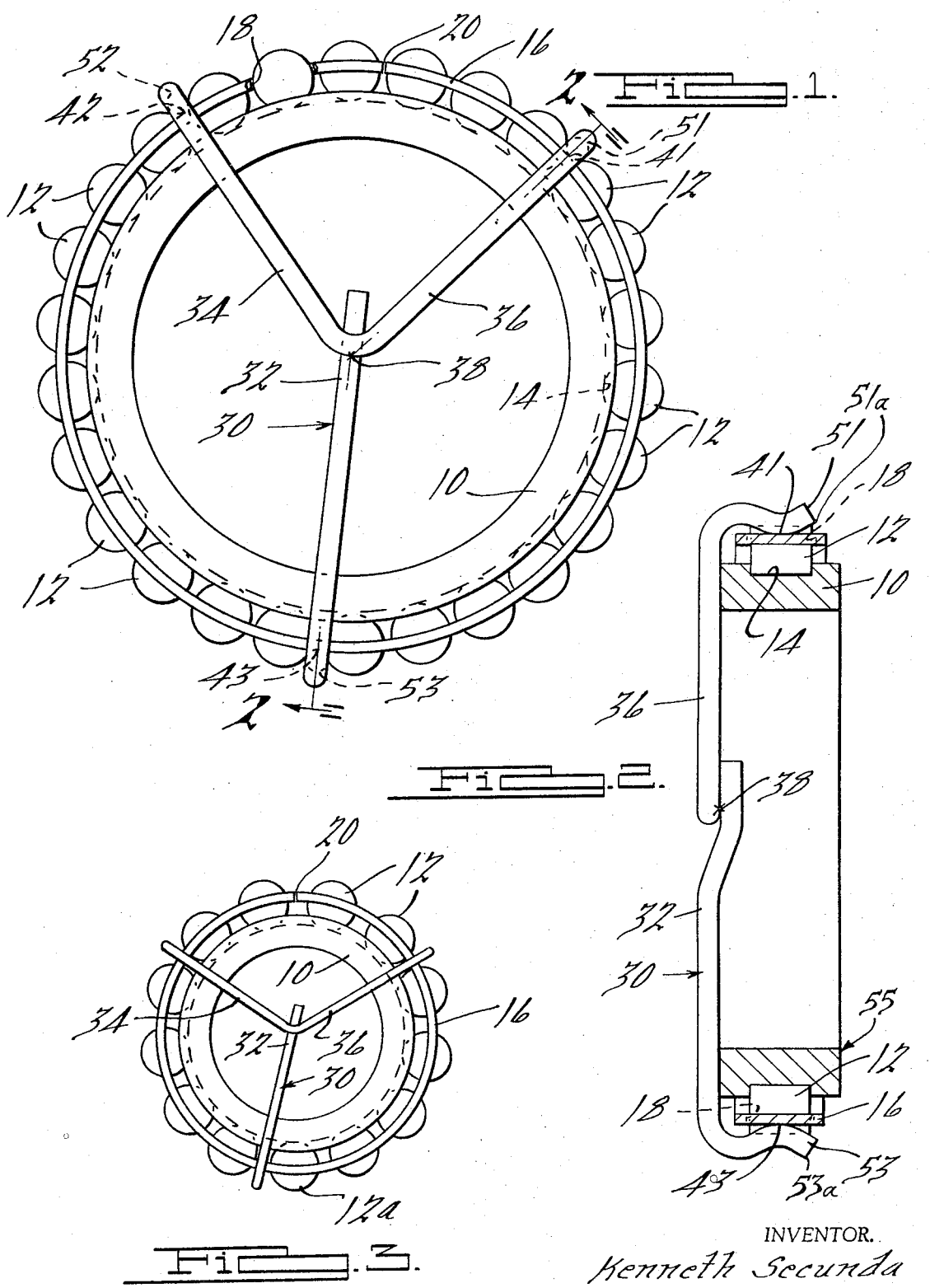

CLAMP FOR BEARING ASSEMBLY

CROSS REFERENCE TO RELATED APPLICATIONS

Reference is here made to copending application Ser. No. 76,530, filed Sept. 28, 1970, entitled "Roller Bearing Assembly Fixture," and copending application Ser. No. 758,467, filed Sept. 9, 1968, entitled "Welded Cage Process," now U.S. Pat 3,605,247, issued to Gerald Bingle, H. Steil, Jr., and C. von Essen, the disclosures of which are incorporated herein by reference.

BACKGROUND OF THE INVENTION

This invention broadly relates to a clamp for use in assembling roller bearing assemblies.

It is an object of this invention to provide a specially structured clamping means for holding a split retainer in a position around a double shouldered race member while it retains a plurality of roller bearings in the race, with said holding or clamping action being particularly utilized prior to the time that the free ends of the retainer are welded together to secure the retainer in the bearing assembly.

Another object of the present invention is to provide a new clamping means for use during the construction of roller bearing assemblies.

Another object of the present invention is to provide a new roller bearing and clamp assembly capable of holding a retainer and roller bearings in place prior to a welding operation such that the bearing assembly does not fall apart during construction thereof.

Another object of the present invention is to provide a new roller bearing and clamp assembly which may be utilized to hold the entire assembly together during the welding operation, that is in a manner such that the clamp does not interfere with the welder or welding operation.

Another object of the present invention is to provide a clamping means for use with a bearing assembly which clamping means can be added to and removed from the bearing assembly with ease and which clamping assembly permits stacking of the bearing assemblies one on top of another in storage; and, further that said clamping means are inexpensive to produce.

Other objects, features and advantages of the present invention will become apparent from the subsequent description and the appended claims taken in conjunction with the accompanying drawings.

BRIEF DESCRIPTION OF THE DRAWings

FIG. 1 illustrates a roller bearing and clamp assembly in accordance with the invention;

FIG. 2 illustrates a cross sectional view taken along the line 2—2 of FIG. 1; and FIG. 3 illustrates another embodiment of the roller bearing and clamp assembly.

SUMMARY OF THE INVENTION

Briefly stated the present invention comprises a roller bearing-clamp assembly comprised of a shouldered race member, a plurality of roller bearings positioned in the race member, an unwelded retainer strip of generally circular shape with a gap therein, at which gap subsequent welding occurs, and a clamp means which inwardly biases the retainer to hold the retainer and bearings in a properly oriented position prior to welding of the retainer, said clamp means being dimensioned such that when it is clamped over the retainer and bearings from one side thereof then no portion protrudes from the other side thereof.

DESCRIPTION OF PREFERRED EMBODIMENTS

Reference is now made to the drawings for a description of the invention, however, other embodiments than those specifically described will be apparent after a review of the disclosure herein is made and no limitation to this specific drawing embodiment shown is intended.

FIGS. 1 and 2 illustrate a roller bearing and clamp assembly wherein a double shouldered race member 10 holds a plurality of roller bearings 12 within the race channel 14. A retainer 16 generally surrounds the race member 10 to hold the bearings 12 within the race channel 14 and, the retainer 16 includes a plurality of windows or openings 18 through which a small portion of the bearings protrude.

The retainer 16 as shown in FIGS. 1 and 2 is unwelded such that a gap 20 is left in the retainer, which gap 20 is closed by subsequent welding operation.

The bearing assembly shown in FIGS. 1 and 2 is of the type in which all bearing parts are assembled loosely and rely on the retainer 16 to hold all the components of the assembly in relationship to each other. The retainer 16 is rolled to the proper diameter to the best practical and economical limits of material and machine operator. However, even when retainers such as 16 are rolled to a specific diameter under identical conditions, prior to welding to close the gap formed at 20, the springback of one retainer may differ markedly from another made substantially in the same fashion due to differences in material hardness, tightness of the wound-up strip stock from which the retainers 16 are made, and normal variations in the methods in which the operator inserts the strip stock into the roll forming machine (not shown) to form the retainers. Thus prior to welding, a number of retainers 16 that are consecutively run from the same coil of stock may normally be expected to have significantly different springback properties. Prior to welding retainers 16 are easily subject to spreading out and if this occurs the components of the bearing assembly are subject to falling out of place.

The clamp means 30 shown in FIGS. 1 and 2 is applied to the bearing assembly prior to final construction thereof, that is, prior to the welding operation which bridges or connects a gap 20 to secure the retainer 16 in its final constructed position. Clamp means 30 is preferably constructed of a material such as wire having a suitable cross sectional diameter and strength. Clamp means 30 is constructed of a first lower leg portion 32 and an upper portion comprised of second leg 34 and a third leg 36. The portions of the clamp 30 are joined or connected together, for example by resistance cross wire welding at the point designated 38.

The clamp means 30 may be removed from the assembly after the retainer 16 is welded at the gap 20, and in this manner the bearing assembly can be welded with the clamp holding it in a proper orientation during the welding operation with the clamp means 30 being subsequently removed after welding is completed. In this regard note that the clamp means 30 holds the ends of the gap 20 close together to facilitate the welding. Alternatively the clamp means 30 may be removed from the assembly prior to the time that retainer 16 is welded and either just prior to or after the assembly is placed in a welding machine fixture such that it is ready for the welding operation to weld across the gap 20.

It has been found that best results are obtained when at least three clamping spots or three contact points designated 41, 42 and 43 are used to inwardly bias the retainer 16 prior to welding thereof such that the retainer 16 and bearings 12 are held in a properly oriented position. The first of the three clamping spots should preferably be either opposite the welding to be made at gap 20 or as closely opposite thereto as possible. The second and third clamping spots should preferably be made, for example with one leg 34 of the clamp and a second leg 36 of the clamp on each side of the gap 20. The legs of the clamp are not equi-angularly located but rather the angle between legs 34 and 36 is substantially less than 120°, this enhances the clamping or gripping action of clamp 30.

The FIG. 3 embodiment illustrates a bearing assembly possessing, for example an odd number of roller bearings 12 wherein it would not be possible to have the lower leg 32 of the clamp contacting the retainer 16 at a clamping point directly opposite the gap 20. Therefore, as shown in the FIG. 3 embodiment the lower leg 32 is shown slightly offset to the left so that it can be put into clamping contact with the retainer 16 slightly to the left of the roller bearing 12a which is directly opposite the gap 20 in FIG. 3. It should be understood in this regard, therefore, that the angular displacement between the legs 32, 34 and 36 of the clamp means 30 can be predetermined and properly oriented to satisfy the clamping requirements for essentially any number of different types of roller bearing assemblies having any different number of roller bearings therein, as well as different dimensional sizes, etc.

In accordance with the inventive concept disclosed herein, it has been found markedly important to construct the clamp means 30 such that the extension feet 51, 52 and 53 are dimensioned such that they will not protrude beyond the right side of the bearing assembly as shown in FIG. 2 once they are fully positioned or clamped into position over the bearing assembly by pressing engagement which introduces the clamp means 30 onto the assembly from the left side thereof as shown in FIG. 2. In this regard it is seen that the end tips of the extension feet, such as, 51a and 53a (visible in FIG. 2) are well back from the right side 55 (FIG. 2) of the assembly and thus then it is desired to stack the roller bearing and clamp assemblies one on top of another, prior to the welding operation, dislodgement of the clamp means 30 from the bearing assembly will not occur. Thus it is to be observed that the clamp means 30 should be dimensioned such that when it is clamped over the retainer 16 from one side thereof that the portions 53a of the clamp 30 do not protrude beyond the other side of the assembly.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. In a roller bearing assembly comprised of a shouldered race member, a plurality of roller bearings positioned in the race member, an unconnected retainer strip of generally circular shape with a gap therein, at which gap subsequent connection occurs, an at least three legged wire clamp means which inwardly biases the retainer and bearings to hold same in a properly oriented position prior to connection of the retainer, said clamp means being dimensioned such that when it is clamped over the retainer and bearings from one side thereof then no portion protrudes from the other side thereof, said wire clamp means being formed of three radially extending leg portions including three foot portions connected thereto which engage the retainer to hold same in proper orientation, and said foot portions each containing a bend therein at which contact is made with the retainer.

2. In a roller bearing assembly comprised of a shouldered race member, a plurality of roller bearings positioned in the race member; an unconnected retainer strip of generally circular shape with a gap therein, at which gap subsequent connection occurs, an at least three legged wire clamp means which inwardly biases the retainer and bearings to hold same in a properly oriented position prior to connection of the retainer, said clamp means being dimensioned such that when it is clamped over the retainer and bearings from one side thereof then no portion protrudes from the other side thereof, said wire clamp means being formed of at least three radially extending leg portions including at least three foot portions connected thereto which engage the retainer to hold same in proper orientation, and said foot portions each containing a bend therein at which contact is made with the retainer.

* * * * *